United States Patent
Zhang et al.

(10) Patent No.: US 11,004,070 B2
(45) Date of Patent: May 11, 2021

(54) METHOD, APPARATUS AND ELECTRONIC DEVICE FOR BLOCKCHAIN TRANSACTIONS

(71) Applicant: ADVANCED NEW TECHNOLOGIES CO., LTD., Grand Cayman (KY)

(72) Inventors: Wenbin Zhang, Hangzhou (CN); Lichun Li, Hangzhou (CN); Baoli Ma, Hangzhou (CN); Zheng Liu, Hangzhou (CN); Shan Yin, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/879,718

(22) Filed: May 20, 2020

(65) Prior Publication Data

US 2020/0286092 A1    Sep. 10, 2020

Related U.S. Application Data

(63) Continuation of application No. 16/588,682, filed on Sep. 30, 2019.

(30) Foreign Application Priority Data

Oct. 26, 2018    (CN) .......................... 201811258194.X

(51) Int. Cl.
*G06Q 20/38*    (2012.01)
*H04L 9/00*    (2006.01)
(Continued)

(52) U.S. Cl.
CPC ......... *G06Q 20/389* (2013.01); *G06Q 20/383* (2013.01); *H04L 9/008* (2013.01);
(Continued)

(58) Field of Classification Search
None
See application file for complete search history.

(56) References Cited

U.S. PATENT DOCUMENTS

2014/0279526 A1    9/2014    Jackson
2016/0253637 A1    9/2016    Watson, III et al.
(Continued)

FOREIGN PATENT DOCUMENTS

CN    1361490 A    7/2002
CN    105827402 A    8/2016
(Continued)

OTHER PUBLICATIONS

Kurt M. Alonso and Koe, Zero To Monery: A technical Guide To A Private Digital Currency, Jun. 26, 2018, First Edition (Year: 2018).*
(Continued)

*Primary Examiner* — Jacob C. Coppola
*Assistant Examiner* — Timothy Paul Sax

(57) ABSTRACT

A method for implementing blockchain-based transactions includes: determining a to-be-remitted amount for each of a plurality of remitters participating in a transaction and a to-be-received amount for each of a plurality of receivers participating in the transaction, wherein the plurality of remitters include one or more real remitters, the plurality of receivers include one or more real receivers, and the plurality of remitters include one or more cover-up remitters and/or the plurality of receivers include one or more cover-up receivers; generating a commitment of the to-be-remitted amount corresponding to the each remitter and a commitment of the to-be-received amount corresponding to the each receiver; and submitting the transaction to a blockchain for execution, wherein the transaction comprises blockchain
(Continued)

account addresses of the remitters and receivers, and the commitments of the to-be-remitted amounts and the to-be-received amounts.

17 Claims, 6 Drawing Sheets

(51) Int. Cl.
*H04L 9/06* (2006.01)
*H04L 9/32* (2006.01)
*G06Q 20/40* (2012.01)

(52) U.S. Cl.
CPC .......... *H04L 9/0637* (2013.01); *H04L 9/3247* (2013.01); *G06Q 20/3825* (2013.01); *G06Q 20/4014* (2013.01); *H04L 2209/38* (2013.01); *H04L 2209/56* (2013.01)

(56) References Cited

U.S. PATENT DOCUMENTS

| | | | |
|---|---|---|---|
| 2016/0358165 A1* | 12/2016 | Maxwell | G06Q 20/0655 |
| 2017/0124483 A1 | 5/2017 | Huang | |
| 2017/0200137 A1 | 7/2017 | Vilmont | |
| 2017/0236120 A1 | 8/2017 | Herlihy et al. | |
| 2017/0364705 A1 | 12/2017 | Villars | |
| 2018/0041345 A1 | 2/2018 | Maim | |
| 2018/0089660 A1 | 3/2018 | Elliott et al. | |
| 2018/0253702 A1 | 9/2018 | Dowding | |
| 2018/0285866 A1 | 10/2018 | Bederov et al. | |
| 2019/0095879 A1* | 3/2019 | Eyal | G06Q 20/06 |
| 2019/0108362 A1 | 4/2019 | Miller | |
| 2019/0108364 A1 | 4/2019 | Roennow et al. | |
| 2019/0164153 A1 | 5/2019 | Agrawal et al. | |
| 2019/0236571 A1 | 8/2019 | Arora et al. | |
| 2019/0356469 A1* | 11/2019 | Deshpande | G06Q 20/3827 |
| 2019/0358515 A1 | 11/2019 | Tran et al. | |
| 2020/0117585 A1* | 4/2020 | Falk | G06Q 20/389 |
| 2020/0349563 A1 | 11/2020 | Lu et al. | |

FOREIGN PATENT DOCUMENTS

| | | | |
|---|---|---|---|
| CN | 106779704 A | 5/2017 | |
| CN | 108021821 A | 5/2018 | |
| CN | 108335106 A | 7/2018 | |
| CN | 108418783 A | 7/2018 | |
| CN | 109729041 A | 5/2019 | |
| CN | 110097462 A | 8/2019 | |
| EP | 3242265 A1 | 11/2017 | |
| EP | 3251046 A2 | 12/2017 | |
| EP | 3413254 A1 | 12/2018 | |
| EP | 3433973 A1 | 1/2019 | |
| TW | I631518 B | 8/2018 | |
| WO | 2018131004 A9 | 12/2018 | |
| WO | 2018224431 A1 | 12/2018 | |
| WO | 2019089646 A1 | 5/2019 | |
| WO | 2019092508 A2 | 5/2019 | |
| WO | 2019142049 A1 | 7/2019 | |

OTHER PUBLICATIONS

Written Opinion and International Search Report for PCT Application No. PCT/US2019/053898 dated Jan. 10, J020.
Alonso et al., "Monero—Privacy in the Blockchain", IACR, May 31, 2013 (47 pages).
Benedikt Bunz et al., "Bulletproofs: Short Proofs for Confidential Transactions and More", IACR, Jul. 2, 2018 (45 pages).
Ma et al., "An Efficient NIZK Scheme for Privacy-Preserving Transactions over Account-Model Blockchain", IACR, Jul. 9, 2018 (12 pages).
Ruffing et al., "Switch Commitments: A Safety Switch for Confidential Transactions", International Conference on Financial Crypography and Data Security, Nov. 19, 2017 (12 pages).
Ruffing et al., "Mixing Confidential Transactions: Comprehensive Transaction Privacy for Bitcoin", IACR, Mar. 9, 2017, 22 pages.
First Search for Chinese Application No. 201811258194.X dated Apr. 24, 2020.
BlockChain, "Master Bitcoin (Second Edition)," Jun. 26, 2018, http://ibloodline.com/articles/2018/01/26/master-bitcoin.html.
Search Report for Taiwanese Application No. 108110896 dated Jan. 17, 2020. [**new].
Search Report for Taiwanese Application No. 108110896 dated May 28, 2020. [**new].
Supplementary Search for Chinese Application No. 201811258194.X dated Aug. 4, 2020. [**new].
Second Office Action for Chinese Application No. 201811258194.X dated Aug. 11, 2020. [**new].
RZKPB: A Privacy-Preserving Blockchain-Based Fair Transaction Method for Sharing Economy, Aug. 1, 2018.
"How to hide the transaction amount and ensure that "coins" will not be added or disappeared for no reason?", Oct. 4, 2018, retrieved on Aug. 4, 2020, https://zhuanlan.zhihu.com/p/45989000.

* cited by examiner

```
┌─────────────────────────────────────────────────────────────┐
│  Determining a to-be-remitted amount for each of multiple remitters │
│  participating in a transaction and a to-be-received amount for each of │
│  multiple receivers participating in the transaction, wherein the multiple │
│  remitters include one or more real remitters, the multiple receivers include │ ~ 102
│  one or more real receivers, the multiple remitters include one or more │
│  cover-up remitters and/or the multiple receivers include one or more │
│                     cover-up receivers                      │
└─────────────────────────────────────────────────────────────┘
                              │
                              ▼
┌─────────────────────────────────────────────────────────────┐
│  Generating a commitment of the to-be-remitted amount corresponding to │
│  the each remitter and a commitment of the to-be-received amount   │ ~ 104
│                 corresponding to the each receiver                 │
└─────────────────────────────────────────────────────────────┘
                              │
                              ▼
┌─────────────────────────────────────────────────────────────┐
│  Submitting to a blockchain the transaction comprising a blockchain account │
│     address of the each remitter, a blockchain account address of the each  │
│  receiver, the each commitment of the to-be-remitted amount, and the each   │
│         commitment of the to-be-received amount, for a corresponding        │
│      commitment of the to-be-remitted amount to be deducted from a          │ ~ 106
│     commitment of the each remitter's balance recorded in the blockchain in │
│    association with the blockchain account address of the each remitter, and │
│   for a corresponding commitment of the to-be-received amount to be added   │
│    to a commitment of the each receiver's balance recorded in the blockchain │
│        in association with the blockchain account address of the each receiver, │
│            after the transaction is implemented by the blockchain           │
└─────────────────────────────────────────────────────────────┘
```

FIG. 1

METHOD, APPARATUS AND ELECTRONIC DEVICE FOR BLOCKCHAIN TRANSACTIONS

CROSS REFERENCE TO RELATED APPLICATION

The present application is a continuation of U.S. application Ser. No. 16/588,682 filed Sep. 30, 2019, and titled "Method, Apparatus and Electronic Device for Blockchain Transactions," which is based on and claims priority to Chinese Patent Application No. 201811258194.X, filed on Oct. 26, 2018. All of the above applications are incorporated herein by reference in their entirety.

TECHNICAL FIELD

One or more embodiments of the present specification relate to the technical field of blockchain, particularly to a method, apparatus, and electronic device for implementing blockchain-based transactions.

BACKGROUND

Blockchain nodes of a blockchain network may jointly maintain a unified blockchain ledger through a consensus reached among the blockchain nodes, to record data of transactions having occurred on the blockchain network. The blockchain ledger can be made public for viewing and verification of historical data of the occurred transactions at any time.

SUMMARY

One or more embodiments of the present specification provide a method, apparatus, non-transitory computer-readable storage medium, and electronic device for implementing blockchain-based transactions.

According to a first aspect of the one or more embodiments of the present specification, provided is a method for implementing blockchain-based transactions, implementable by a computing device. The method may comprise: determining a to-be-remitted amount for each of a plurality of remitters participating in a transaction and a to-be-received amount for each of a plurality of receivers participating in the transaction, wherein: the plurality of remitters include one or more real remitters, the plurality of receivers include one or more real receivers, and the plurality of remitters include one or more cover-up remitters and/or the plurality of receivers include one or more cover-up receivers; generating a commitment of the to-be-remitted amount corresponding to the each remitter and a commitment of the to-be-received amount corresponding to the each receiver; and submitting to a blockchain the transaction comprising a blockchain account address of the each remitter, a blockchain account address of the each receiver, the each commitment of the to-be-remitted amount, and the each commitment of the to-be-received amount, for a corresponding commitment of the to-be-remitted amount to be deducted from a commitment of the each remitter's balance recorded in the blockchain in association with the blockchain account address of the each remitter, and for a corresponding commitment of the to-be-received amount to be added to a commitment of the each receiver's balance recorded in the blockchain in association with the blockchain account address of the each receiver, after the transaction is implemented by the blockchain.

In some embodiments, the to-be-remitted amount corresponding to each of the one or more real remitters and the to-be-received amount corresponding to each of the one or more real receivers are preset; and after the transaction is implemented by the blockchain, the to-be-remitted amount is deducted from the each real remitter's balance corresponding to the blockchain account address of the real remitter, and the to-be-received amount is added to the each real receiver's balance corresponding to the blockchain account address of the real receiver.

In some embodiments, after the transaction is implemented by the blockchain, the each cover-up remitter's balance in association with a corresponding blockchain account address and the each cover-up receiver's balance in association with a corresponding blockchain account address remain unchanged.

In some embodiments, the commitment of the each receiver's balance comprises a homomorphic encryption of the each receiver's balance based on a first random number; and the commitment of the to-be-received amount corresponding to the each receiver comprises a homomorphic encryption of the to-be-received amount based on a second random number. In some embodiments, the homomorphic encryption is Pedersen Commitment.

In some embodiments, before submitting to the blockchain the transaction, the method may further comprise: sending the second random number to a second computing device associated with the each receiver via an off-chain channel for the second computing device to update the each receiver's balance according to an updated commitment of the each receiver's balance and an updated first random number.

In some embodiments, the updated commitment of the each receiver's balance is a sum of the commitment of the to-be-received amount and the commitment of the receiver's balance; the updated first random number is a sum of the second random number and the first random number; and the each receiver's balance is updated to be a sum of the each receiver's balance and the to-be-received amount corresponding to the each receiver.

In some embodiments, before submitting to the blockchain the transaction, the method may further comprise sending the to-be-received amount and the commitment of the to-be-received amount to the second computing device associated with the each receiver via the off-chain channel for the second computing device associated with the each receiver to verify an association among the commitment of the to-be-received amount, the second random number, and the to-be-received amount.

In some embodiments, the method may further comprise obtaining a receiver signature endorsing the commitment of the to-be-received amount, wherein the receiver signature is generated by the second computing device associated with the each receiver based on a receiver private key, in response to successful verification of the association; and adding the receiver signature to the transaction for a plurality of blockchain nodes maintaining the blockchain to verify the receiver signature.

In some embodiments, the method may further comprise obtaining a remitter signature generated by a third computing device associated with a remitter based on a remitter private key; and adding the remitter signature to the transaction for a plurality of blockchain nodes maintaining the blockchain to verify the remitter signature.

In some embodiments, the method may further comprise obtaining a remitter range proof and a receiver range proof; and adding the remitter range proof and the receiver range proof to the transaction for a plurality of blockchain nodes maintaining the blockchain to: verify that the to-be-remitted amount corresponding to the each remitter is not less than zero, verify based on the remitter range proof that the each remitter's balance is not less than the to-be-remitted amount corresponding to the each remitter, and verify based on the receiver range proof that the to-be-received amount corresponding to the each receiver is not less than zero.

In some embodiments, the commitment of the each to-be-remitted amount corresponding to the each remitter comprises a homomorphic encryption of the to-be-remitted amount based on a third random number corresponding to the remitter; and the commitment of the each to-be-received amount corresponding to the each receiver comprises a homomorphic encryption of the to-be-received amount based on a fourth random number corresponding to the receiver.

In some embodiments, the method may further comprise generating a verification random number by summing the third random number corresponding to the each remitter and subtracting the fourth random number corresponding to the each receiver; and adding the verification random number into the transaction for a plurality of blockchain nodes maintaining the blockchain to verify that an input of the transaction is equal to an output of the transaction.

According to a second aspect of the one or more embodiments of the present specification, an apparatus for implementing blockchain-based transactions is provided. The apparatus may comprise: one or more processors and one or more non-transitory computer-readable memories coupled to the one or more processors and configured with instructions executable by the one or more processors to cause the apparatus to perform operations comprising: determining a to-be-remitted amount for each of a plurality of remitters participating in a transaction and a to-be-received amount for each of a plurality of receivers participating in the transaction, wherein: the plurality of remitters include one or more real remitters, the plurality of receivers include one or more real receivers, and the plurality of remitters include one or more cover-up remitters and/or the plurality of receivers include one or more cover-up receivers; generating a commitment of the to-be-remitted amount corresponding to the each remitter and a commitment of the to-be-received amount corresponding to the each receiver; and submitting to a blockchain the transaction comprising a blockchain account address of the each remitter, a blockchain account address of the each receiver, the each commitment of the to-be-remitted amount, and the each commitment of the to-be-received amount, for a corresponding commitment of the to-be-remitted amount to be deducted from a commitment of the each remitter's balance recorded in the blockchain in association with the blockchain account address of the each remitter, and for a corresponding commitment of the to-be-received amount to be added to a commitment of the each receiver's balance recorded in the blockchain in association with the blockchain account address of the each receiver, after the transaction is implemented by the blockchain.

According to a third aspect of the one or more embodiments of the present specification, a non-transitory computer-readable storage medium is provided. The non-transitory computer-readable storage medium may be configured with instructions executable by one or more processors to cause the one or more processors to perform operations comprising: determining a to-be-remitted amount for each of a plurality of remitters participating in a transaction and a to-be-received amount for each of a plurality of receivers participating in the transaction, wherein: the plurality of remitters include one or more real remitters, the plurality of receivers include one or more real receivers, and the plurality of remitters include one or more cover-up remitters and/or the plurality of receivers include one or more cover-up receivers; generating a commitment of the to-be-remitted amount corresponding to the each remitter and a commitment of the to-be-received amount corresponding to the each receiver; and submitting to a blockchain the transaction comprising a blockchain account address of the each remitter, a blockchain account address of the each receiver, the each commitment of the to-be-remitted amount, and the each commitment of the to-be-received amount, for a corresponding commitment of the to-be-remitted amount to be deducted from a commitment of the each remitter's balance recorded in the blockchain in association with the blockchain account address of the each remitter, and for a corresponding commitment of the to-be-received amount to be added to a commitment of the each receiver's balance recorded in the blockchain in association with the blockchain account address of the each receiver, after the transaction is implemented by the blockchain.

According to a fourth aspect of the one or more embodiments of the present specification, an electronic device is provided. The electronic device may comprise: a processor, and a memory for storing instructions executable by the processor, wherein the processor executes the instructions to achieve the methods in any of the foregoing embodiments.

BRIEF DESCRIPTION OF THE DRAWING

FIG. 1 is a flow chart of a method for implementing blockchain-based transactions according to some embodiments.

DETAILED DESCRIPTION

Figure 2:
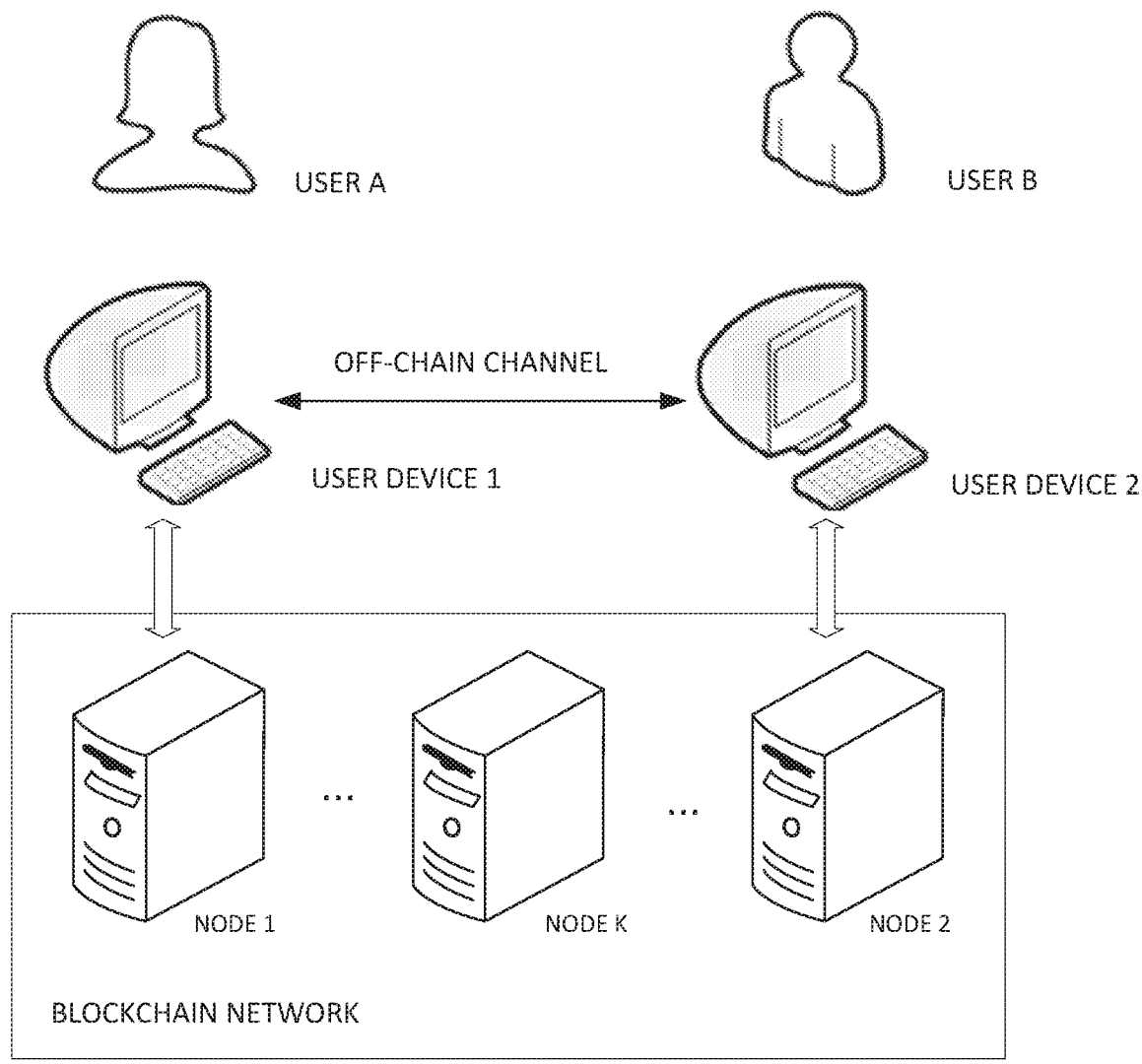
FIG. 2 is a schematic diagram of implementation of a remittance transaction in a blockchain network according to some embodiments.

Embodiments will be described in detail, with examples shown in the accompanying drawings. When the description below involves the accompanying drawings, unless otherwise indicated, the same numeral in different accompanying drawings stands for the same or similar element. The implementation manners described in the following embodiments do not represent all the implementation manners consistent with the present specification. Conversely, they are only examples of the apparatuses and methods described in detail in the attached claims and consistent with some aspects of one or more embodiments of the present specification.

In some embodiments, it is not necessary to perform steps in the methods according to the sequence illustrated and described in the present specification. In some other embodiments, the steps of the methods may be more or less than those described in the present specification. Further, a single step described in the present specification may be split into multiple steps for description in other embodiments, while multiple steps described in the present specification may be merged into one single step for description in yet other embodiments.

In the specification, a remitter, receiver, and organizer may refer to an individual or entity participating the blockchain-based transactions. For example, a remitter may be an individual or entity remitting money to a receiver through a transaction. A receiver may be an individual or entity receiving money from a remitter through the transaction. An organizer may be an individual or entity organizing or facilitating the transaction. For convenience and conciseness, a remitter, receiver, and organizer described in the specification may also refer to a computing device associated with the human or entity remitter, receiver, and organizer respectively. The computing device may be a personal computer, a laptop computer, a cell phone, a camera phone, a smart phone, a PDA (personal digital assistant), a media player, a navigation device, an email sending and receiving device, a game console, a tablet computer, a wearable device or any combination of a few of these devices.

FIG. 1 is a flow chart of a method for implementing blockchain-based transactions according to one embodiment. As shown in FIG. 1, this method may be implemented by one or more computing devices as blockchain nodes, and may comprise the following steps:

Step 102, determining a to-be-remitted amount for each of multiple remitters participating in a transaction and a to-be-received amount for each of multiple receivers participating in the transaction, wherein the multiple remitters include one or more real remitters, the multiple receivers include one or more real receivers, the multiple remitters include one or more cover-up remitters and/or the multiple receivers include one or more cover-up receivers.

In some embodiments, the plurality of remitters may include one or more real remitters and one or more cover-up remitters. A blockchain transaction solution provided by the present specification may be applied to a remitter device corresponding to a real or cover-up remitter, such as a remitter device corresponding to either a real remitter or a cover-up remitter. Alternatively, the plurality of remitters may only include one or more real remitters, and a blockchain transaction solution provided by the present specification may be applied to remitter devices corresponding to real remitters.

In some embodiments, a blockchain transaction solution provided by the present specification may be applied to an organizer device corresponding to an organizer. The organizer may be any of the foregoing remitters. Alternatively, the organizer may not be a remitter. This is not limited by the embodiments of the present specification.

In still some embodiments, by including one or more cover-up remitters in the all remitters, the one or more real remitters' identities may be hidden. In other words, it is indeterminable whether each remitter is a real remitter or a cover-up remitter. When there are a large number of cover-up remitters, the one or more real remitters can be covered even better. Similarly, by including one or more cover-up receivers in the all receivers, the one or more real receivers' identities may be hidden. In other words, it is indeterminable whether each receiver is a real receiver or a cover-up receiver. When there are a large number of cover-up receivers, real receivers can be covered even better.

In still other embodiments, the remitters may negotiate with each other to determine to-be-remitted amounts and to-be-received amounts. The to-be-remitted amount of one or more real remitters and the to-be-received amount of one or more real receivers match the remittance amount of the transaction between them. The to-be-remitted amount of one or more cover-up remitters and the to-be-received amount of one or more cover-up receivers may use any value determined through negotiation. For example, the to-be-remitted amount of a cover-up remitter and the to-be-received amount of a cover-up receiver may both be zero, while the to-be-remitted amount of a real remitter and the to-be-received amount of a real receiver may be both the remittance amount. This method may avoid incurring changes to blockchain accounts of cover-up remitters and cover-up receivers and thus help to reduce the complexity of subsequent processing. In addition, the to-be-remitted amounts and to-be-received amounts may be recorded in the blockchain accounts in the form of commitments of the to-be-remitted amounts and commitments of the to-be-received amounts respectively. The commitments of zero values and non-zero-values are indistinguishable from one another. Therefore, the actual values of the to-be-remitted amounts and to-be-received amounts cannot be recognized directly and identities of the real remitters and real receivers will be protected.

In some embodiments, by remitting an asset certificate corresponding to a to-be-remitted amount from a remitter's blockchain account and remitting an asset certificate corresponding to a to-be-received amount into a receiver's blockchain account, the remittance between the remitter and the receiver may be achieved. The asset certificate may correspond to a token, a digital asset, or any other intelligent asset in a blockchain. Alternatively, the asset certificate may also correspond to cash, security, discount coupon, real estate, and any other off-chain asset. This is not limited by embodiments of the present specification.

In some embodiments, cover-up remitters and cover-up receivers may correspond to real individuals or enterprises. For example, blockchain accounts held by these individuals or enterprises may be borrowed to be used as cover-ups, provided that these blockchain accounts will not suffer loss or privacy leak.

In still some embodiments, cover-up remitters and cover-up receivers may be used to achieve remittance cover-up exclusively, but do not correspond to real individuals or enterprises. In other words, cover-up remitters and cover-up receivers may correspond to virtual objects. In some embodiments, cover-up remitters and cover-up receivers may exist for a long time, and are used to achieve cover-up in the process of remittance. Alternatively, cover-up remitters and cover-up receivers may be created temporarily each time when remittance is to be implemented, and be written off after the remittance is completed.

Step 104, generating a commitment of the to-be-remitted amount corresponding to the each remitter and generating a commitment of the to-be-received amount corresponding to the each receiver.

In some embodiments, the blockchain nodes in a blockchain respectively maintain a unified blockchain ledger based on consensus. By registering commitments of to-be-remitted amounts and commitments of to-be-received amounts in the blockchain, the blockchain ledger maintained by the blockchain nodes records the commitments of to-be-remitted amounts and commitments of to-be-received amounts, and may not directly record to-be-remitted amounts and to-be-received amounts. As a result, the to-be-remitted amounts and the to-be-received amounts are concealed as private data. Similarly, a remitter's balance may be recorded as a commitment of the remitter's balance in the blockchain ledger, and a receiver's balance may be recorded as a commitment of the receiver's balance in the blockchain ledger. Any type of balance associated with a remitter or a receiver may be recorded as a corresponding commitment of the balance in a blockchain ledger to protect the privacy of the owner. The relation between any balance and a corresponding commitment of the balance, the relation between any to-be-remitted amount and a corresponding commitment of the to-be-remitted amount, and the relation between any to-be-received amount and a corresponding commitment of the to-be-received amount described herein will not be elaborated again below. For conciseness, a commitment of a to-be-remitted amount may be referred to as a to-be-remitted amount commitment, a commitment of a to-be-received amount may be referred to as a to-be-received amount commitment, a commitment of the remitter's balance may be referred to as a remitter's balance commitment, and a commitment of the receiver's balance may be referred to as a receiver's balance commitment, hereinafter.

Further, a balance may be converted into a corresponding balance commitment through a homomorphic encryption algorithm. The balance commitment includes a homomorphic encryption of the balance based on a random number. Similarly, the foregoing to-be-remitted amount may be converted into a corresponding to-be-remitted amount commitment. Any type of homomorphic encryption algorithm may be adopted, such as a Pedersen commitment mechanism. A homomorphic encryption may be Pederson Commitment. This is not limited by the embodiments of the present specification.

Step 106, submitting to a blockchain the transaction comprising a blockchain account address of the each remitter, a blockchain account address of the each receiver, the each commitment of the to-be-remitted amount, and the each commitment of the to-be-received amount, for a corresponding commitment of the to-be-remitted amount to be deducted from a commitment of the each remitter's balance recorded in the blockchain in association with the blockchain account address of the each remitter, and for a corresponding commitment of the to-be-received amount to be added to a commitment of the each receiver's balance recorded in the blockchain in association with the blockchain account address of the each receiver, after the transaction is implemented by the blockchain.

In some embodiments, the transaction amounts between the real remitters and the real receivers are preset amounts. After completion of the transaction, the preset amounts are deducted respectively from the real remitter's balances corresponding to the blockchain account addresses of the real remitters, the preset amounts are added respectively to the real receiver's balances corresponding to the blockchain account addresses of the real receivers, and the cover-up remitter's balances corresponding to the blockchain account addresses of the cover-up remitters and the cover-up receiver's balances corresponding to the blockchain account addresses of the cover-up receivers remain unchanged.

For example, to-be-remitted amounts of real remitters and to-be-received amounts of real receivers are both preset amounts, while to-be-remitted amounts of cover-up remitters and to-be-received amounts of cover-up receivers are both zero, such that remittance operations occur from the real remitters to the real receivers in the foregoing transaction process, while no funds flow between the cover-up remitters and the cover-up receivers.

In another example, real remitters, real receivers, cover-up remitters, and cover-up receivers all have a flow of funds in the foregoing interaction process. But cover-up remitters may also play a role of cover-up receivers, and cover-up receivers may also play a role of cover-up remitters. For example, a blockchain account functions as a cover-up remitter with a corresponding to-be-remitted amount of E1, and simultaneously functions as a cover-up receiver with corresponding to-be-received amounts of E2 and E3. In addition, E1=E2+E3. Therefore, the balance corresponding to this blockchain account's address is not changed after completion of the transaction (break-even is achieved between the to-be-remitted amount E1 and the to-be-received amounts E2 and E3).

In some embodiments, a commitment of a receiver's balance $SB_j$ (also referred to as a receiver's balance commitment $SB_j$, hereinafter) corresponding to a receiver $B\_j$ is calculated by using a homomorphic encryption algorithm according to a receiver's balance $s\_B\_j$ and a receiver's balance random number $r\_B\_j$. A commitment $T\_B\_j$ of a to-be-received amount $t\_B\_j$ (also referred to as a to-be-received amount commitment $T\_B\_j$, hereinafter) corresponding to the receiver $B\_j$ is calculated by using the homomorphic encryption algorithm according to a to-be-received amount $t\_B\_j$ and a to-be-received amount random number $b\_j$. Blockchain nodes may send the to-be-received amount random number $b\_j$ to the receiver $B\_j$ via an off-chain channel, so that the receiver $B\_j$ determines an updated receiver's balance $s\_B\_j'$ according to an updated receiver's balance commitment $S\_B\_j'$ and an updated receiver's balance random number $r\_B\_j'$. For example, the updated receiver's balance commitment $S\_B\_j'$ is obtained by adding the to-be-received amount commitment $T\_B\_j$ to the receiver's balance commitment $S\_B\_j$, the updated receiver's balance random number $r\_B\_j'$ is obtained by adding the to-be-received amount random number $b\_j$ to the receiver's balance random number $r\_B\_j$, and the updated receiver's balance $s\_B\_j'$ is the sum of the receiver's balance $s\_B\_j$ and the to-be-received amount $t\_B\_j$. The receiver $B\_j$ stands for the $j^{th}$ receiver and when the number of receivers is "n," $1 \leq j \leq n$.

In some embodiments, a receiver's balance random number $r\_B\_j$ may refer to a random number used for generating the commitment of the receiver's balance. For example, the receiver's balance random number may be determined by an organizer or remitter. Similarly, a to-be-received amount random number $b\_j$ may refer to a random number used for generating the commitment of the to-be-received amount. For example, the to-be-received amount random number may be determined by an organizer or remitter.

In other embodiments, before the transaction is submitted, blockchain nodes may send a to-be-received amount $t\_B\_j$ and a to-be-received amount commitment $T\_B\_j$ to a receiver $B\_j$ via an off-chain channel for the receiver $B\_j$ to verify the association among the to-be-received amount commitment $T\_B\_j$, the to-be-received amount random number $b\_j$, and the to-be-received amount $t\_B\_j$ corresponding to the receiver $B\_j$. The receiver $B\_j$ may authorize implementation of the transaction after the verification succeeds, otherwise may reject the implementation of the transaction. For example, the receiver $B\_j$ may provide a receiver signature described below after the verification succeeds, otherwise may reject to provide the receiver signature.

In some embodiments, blockchain nodes may obtain a receiver signature $SIG\_B\_j$ that is generated by the receiver $B\_j$ via a receiver private key held by the receiver and is related to the to-be-received amount commitment $T\_B\_j$. The receiver signature $SIG\_B\_j$ is generated by the receiver $B\_j$ after the association has passed verification. Then the receiver signature SIG_B_j is added to the transaction for the blockchain nodes in the blockchain to conduct signature verification. For example, when a transaction does not contain this receiver signature SIG_B_j, the blockchain nodes receiving this transaction may determine that consensus failed, and thereby reject to proceed with this transaction.

In some embodiments, blockchain nodes may obtain a remitter signature SIG_A_i that is generated by the remitter A_i via a remitter private key held by the remitter, and add the remitter signature SIG_A_i to the transaction for the blockchain nodes in the blockchain to conduct signature verification. In other embodiments, the remitter signature may also be related to a range proof. For example, when a transaction does not contain this remitter signature, the blockchain nodes receiving this transaction may determine that consensus failed, and thereby reject to proceed with this transaction. The remitter A_i stands for the $i^{th}$ remitter and when the number of remitters is "m," $1 \leq i \leq m$.

In other embodiments, blockchain nodes may obtain a remitter range proof Pf_A_i and a receiver range proof Pf_B_j, and add the remitter range proof Pf_A_i and the receiver range proof Pf_B_j to the transaction for the blockchain nodes in the blockchain to conduct value verification. In some embodiments, the remitter range proof Pf_A_i is used to prove that a to-be-remitted amount t_A_i corresponding to a remitter A_i is not less than zero, and a remitter's balance s_A_i corresponding to the remitter A_i is not less than the to-be-remitted amount t_A_i. The receiver range proof Pf_B_j is used to prove that a to-be-received amount t_B_j corresponding to a receiver B_j is not less than zero.

In some embodiments, a remitter A_1, a remitter A_2, ..., and a remitter A_m generate a remitter range proof Pf_A_1, a remitter range proof Pf_A_2, ..., and a remitter range proof Pf_A_m, respectively. A receiver B_1, a receiver B_2, ..., and a receiver B_n generate a receiver range proof Pf_B_1, a receiver range proof Pf_B_2, ..., and a receiver range proof Pf_B_n, respectively. Then, a blockchain node that has applied a blockchain transaction solution provided by the present specification may respectively receive the remitter range proof Pf_A_i and the receiver range proof Pf_B_j generated by the each remitter and receiver respectively. For example, the blockchain node may be a remitter A_x. If so, the remitter A_x may receive the remitter range proofs generated by the other remitters as well as the receiver range proofs generated by the receivers.

In other embodiments, a blockchain node that has applied a blockchain transaction solution provided by the present specification may generate the foregoing remitter range proof Pf_A_i and receiver range proof Pf_B_j respectively.

In some embodiments, a commitment T_A_i of the to-be-remitted amount t_A_i (also referred to as a to-be-remitted amount commitment T_A_j, hereinafter) is calculated by using a homomorphic encryption algorithm based on the to-be-remitted amount t_A_i and a to-be-remitted amount random number a_i corresponding to the remitter A_i, where $0<i \leq m$ and m is the number of the remitters. The to-be-received amount commitment T_B_j is calculated by using a homomorphic encryption algorithm based on the to-be-received amount t_B_j and the to-be-received amount random number b_j corresponding to the receiver B_j, where $0<j \leq n$ and n is the number of the receivers. The blockchain node may generate a verification random number f= a_1+ ... +a_m−b_1− ... −b_n, and add the verification random number "f" to the transaction for the blockchain nodes in the blockchain to verify that the input of the transaction is equal to the output of the transaction. If the input is not equal to the output, execution of this transaction may be rejected. Similar to the to-be-received amount random number, a to-be-remitted amount random number a_i may refer to a random number used for generating the commitment of the to-be-remitted amount. For example, the to-be-received amount random number may be determined by an organizer or remitter.

A remittance transaction in a blockchain network is taken as an example below to describe the technical solution of the present specification in detail. FIG. 2 is a schematic diagram of implementation of a remittance transaction in a blockchain network according to various embodiments. As shown in FIG. 2, it is assumed that a user A conducts remittance to a user B in a blockchain. A "user" in the present specification may be manifested as a login user account, while this user account may belong to an individual or an organization. This is not limited by the embodiments of the present specification.

It is assumed that a remitter device used by the user A is a user device 1. For instance, a user account corresponding to the user A is logged in on this user device 1. Similarly, a receiver device used by the user B is a user device 2. An off-chain channel may be established between the user device 1 and user device 2 to achieve corresponding off-chain communication.

A client program of blockchain may be run on the user device 1 so that the user device 1 runs a corresponding blockchain node in the blockchain network, such as the node 1 shown in FIG. 2. Similarly, a client program of blockchain may be run on the user device 2 so that the user device 2 also runs a corresponding blockchain node in the blockchain network, such as the node 2 shown in FIG. 2. The blockchain network also includes other blockchain nodes, such as the node k shown in FIG. 2. The blockchain nodes are not enumerated here. Through the foregoing node 1, node 2, etc., the remittance transaction between the user A and the user B may be implemented via the blockchain network, and related transaction information may be recorded in the blockchain ledger maintained by the blockchain nodes respectively, thereby preventing the recorded transaction information from being tampered with, and also facilitating subsequent inspection.

Figure 3:
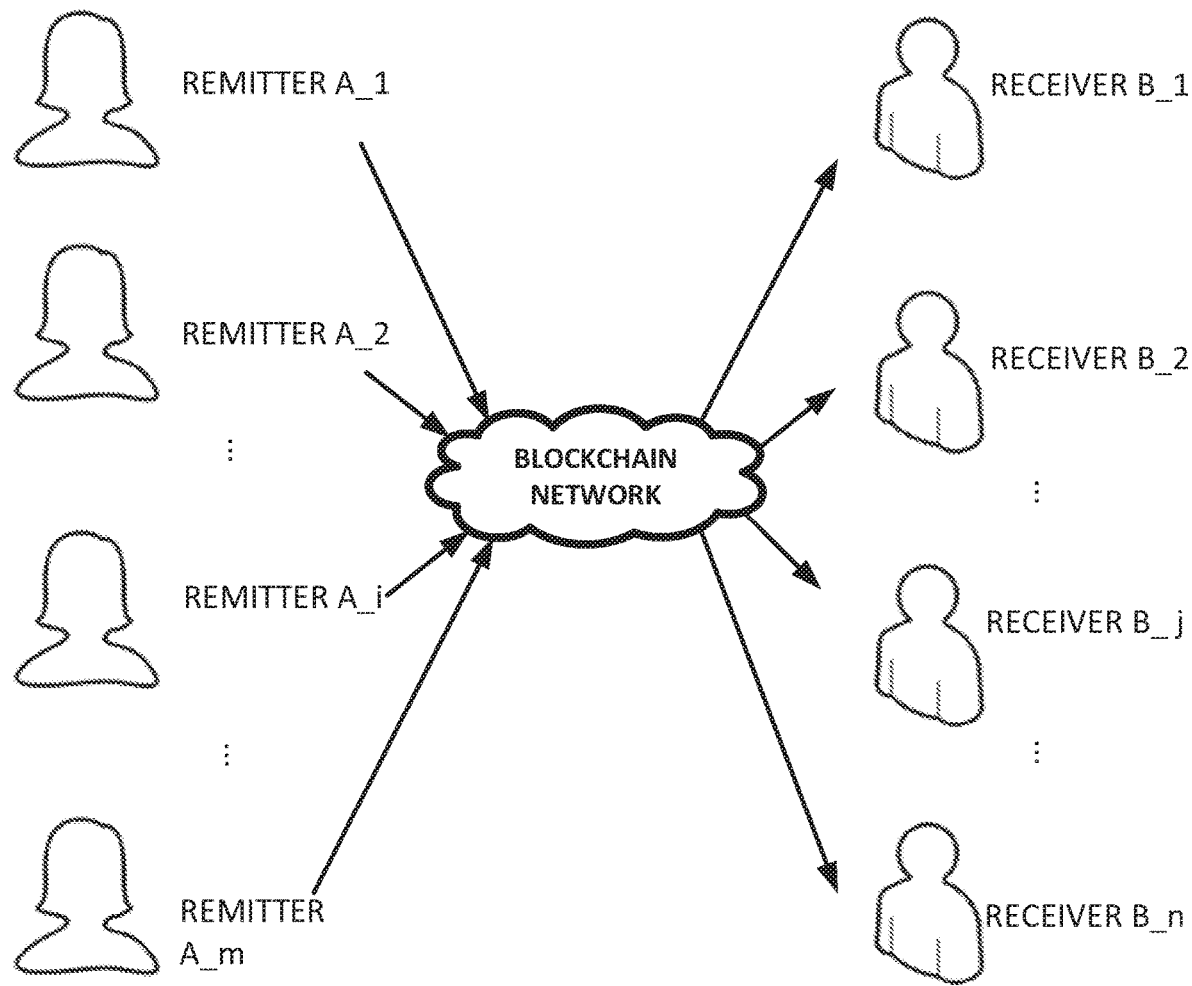
FIG. 3 is a schematic diagram of achievement of anonymous remittance in a blockchain according to some embodiments.

FIG. 3 is a schematic diagram of achievement of anonymous remittance in a blockchain according to various embodiments. In respect to the foregoing remittance transaction from the user A to the user B, the user A is a real remitter of the remittance transaction, and the user B is a real receiver of the remittance transaction. Based on a technical solution of the present specification, cover-up remitters other than the user A and cover-up receivers other than the user B may be added, shown as a remitter A_1, a remitter A_2, ..., a remitter A_m and a receiver B_1, a receiver B_2, ..., a receiver B_n in FIG. 3, to conceal the user A among the remitters A_1~A_m and the user B among the receivers B_1~B_n. For example, the user A may be any one of the remitters A_1~A_m, and the user B may be any one of the receivers B_1~B_n. In addition, the to-be-remitted amounts and to-be-received amounts may be also concealed through homomorphic encryption. This approach may hide the real identities of the each remitter and receiver in the public record of the blockchain transaction, and make it difficult to determine whether the remittance is made from the user A to the user B, or to determine the actual amount of the remittance, thereby achieving anonymous remittance in the blockchain.

Figure 4:
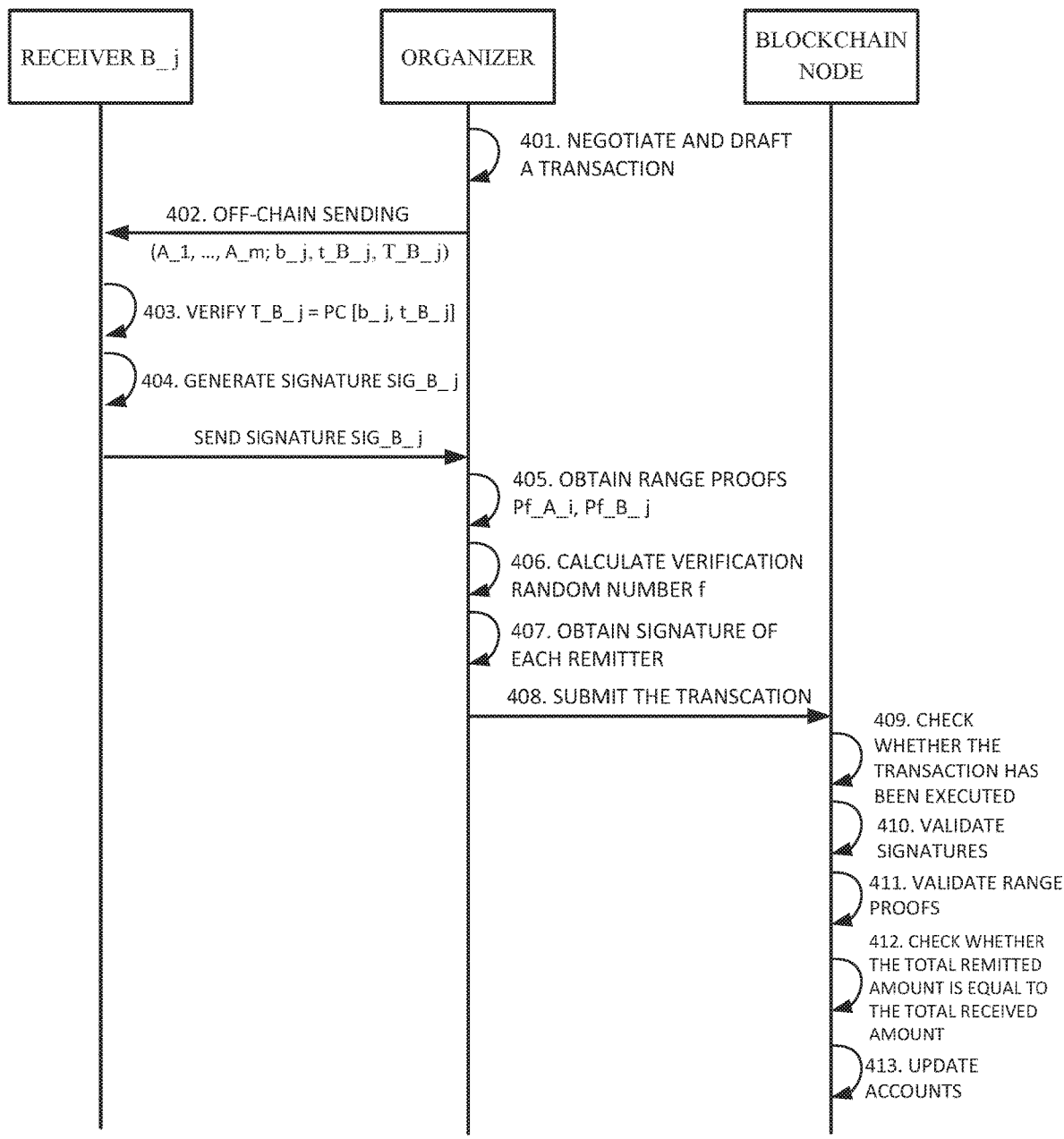
FIG. 4 is a flow chart of implementation of a remittance transaction in a blockchain network according to some embodiments.

It is assumed that the node 1 is an organizer among the remitters A_1~A_m in FIG. 3. Through a process of interaction among the organizer, the receiver B_j (the processing methods of the receivers B_1~B_n are the same and the "receiver B_j" is taken as an example) and the blockchain nodes as shown in FIG. 4, a remittance transaction between the user A and the user B is achieved. FIG. 4 is a flow chart of implementation of a remittance transaction in a blockchain network according to various embodiments.

As shown in FIG. 4, the process of interaction among the organizer, the receiver B_j and the blockchain nodes may comprise the following steps.

At step 401, the organizer negotiates with other remitters and drafts a transaction.

In some embodiments, it is assumed that the organizer is the remitter A_1 and the user B corresponds to the receiver B_1, while the remitters A_2~A_m are cover-up remitters, and the receivers B_2~B_n are cover-up receivers. After it is determined that remittance is to be made from the user A to the user B, the remitter A_1 may select the foregoing remitters A_2~A_m and the receivers B_2~B_n by a preset method, or the remitters A_2~A_m and the receivers B_2~B_n are determined by any other method so that the remitters A_2~A_m and the receivers B_2~B_n may cooperate with the remitter A_1 and the receiver B_1 to achieve anonymous remittance in the blockchain.

In other embodiments, negotiations may be conducted among remitters A_1~A_m to determine the to-be-remitted amount t_A_i to which the each remitter A_i (where, 1≤i≤m) corresponds, as well as the to-be-received amount t_B_j to which the each receiver B_j (where, 1≤j≤n) corresponds.

In some embodiments, a corresponding to-be-remitted amount random number a_i may be determined for the each to-be-remitted amount t_A_i, and a corresponding to-be-received amount random number b_j may be determined for the each to-be-received amount t_B_j. Then through a Pedersen commitment (PC) mechanism, a commitment T_A_i of the to-be-remitted amount t_A_i and a commitment T_B_j of the to-be-received amount t_B_j corresponding are calculated respectively, where the to-be-remitted amount commitment T_A_i=PC(a_i, t_A_i)=a_i×G+t_A_i×H, the to-be-received amount commitment T_B_j=PC(b_j, t_B_j)=b_j×G+t_B_j×H, and G and H are known functions (such as generators used to generate an elliptic curve).

At step 402, the organizer sends (A_1, . . . , A_m; b_j, t_B_j, T_B_j) to a receiver B_j via an off-chain channel.

In some embodiments, sending (A_1, . . . , A_m; b_j, t_B_j, T_B_j) via an off-chain channel rather than a blockchain network may avoid recording the to-be-received amount random number b_j and to-be-received amount t_B_j in the blockchain ledger, and ensure the received remittance amount t_B_j is unknown except to remitter A_i and receiver B_j.

In other embodiments, the organizer sends (A_1, . . . , A_m; b_1, t_B_1, T_B_1) to the receiver B_1, sends (A_1, . . . , A_m; b_2, t_B_2, T_B_2) to the receiver B_2, . . . , and sends (A_1, . . . , A_m; b_j, t_B_j, T_B_j) to a receiver B_j, and every receiver verifies the receiver's corresponding to-be-received amount, to-be-received amount random number and commitment of the to-be-received amount.

In some embodiments, A_1~A_m in (A_1, . . . , A_m; b_j, t_B_j, T_B_J) represent the foregoing remitter A_1 remitter A_m.

At step 403, the receiver B_j verifies the received (A_1, . . . , A_m; b_j, t_B_j, T_B_j).

In some embodiments, the receiver B_j may verify the to-be-received amount commitment T_B_j. In other words, the receiver B_j may calculate the to-be-received amount random number b_j and the received remittance amount t_B_j through a Pedersen commitment mechanism to verify whether the commitment T_B_J=PC (b_j, t_B_j) is correct. If yes, it means that the verification is successful. If not, it means that the verification is not successful.

At step 404, after the verification is successful, the receiver B_j generates a signature and returns the signature to the organizer.

In some embodiments, after the verification is successful, the receiver B_j may use a receiver private key to sign (A_1, . . . , A_m; b_j, t_B_j, T_B_j), generate a signature SIG_B_j and return the signature to a remitter. This signature SIG_B_j indicates that the receiver B_j agrees to the remittance transaction participated by remitters A_1~A_m, and that the receiver B_j will obtain the to-be-received amount corresponding to the commitment T_B_j from the remittance transaction.

At step 405, after receiving the signature SIG_B_j, the organizer generates range proofs Pf_A_i and Pf_B_j.

In some embodiments, after the organizer receives a signature SIG_B_1 returned by the receiver B_1, a signature SIG_B_2 returned by the receiver B_2, . . . , a signature SIG_B_j returned by the receiver B_j, . . . , a signature SIG_B_n returned by the receiver B_n, the organizer determines that the receivers B_1~B_n permit implementation of the remittance transaction.

In other embodiments, the blockchain nodes may determine that the to-be-remitted amount t_A_i corresponding to the remitter A_i meets the following conditions: t_A_i≥0 and s_A_i≥t_A_i, where s_A_i is a remitter's balance corresponding to the remitter A_i. This remitter's balance s_A_i is recorded as a corresponding remitter's balance commitment S_A_i in a blockchain ledger. The range proof technology enables blockchain nodes to verify whether a transaction meets the foregoing conditions in a ciphertext state. For example, the present specification may be achieved by using a Bulletproofs solution, a Borromean ring signature solution, etc., which is not limited by the embodiments of the present specification. Each remitter A_i may use range proof technology to generate a corresponding range proof Pf_A_i, and provide the range proof to the organizer. Here, the organizer, as the remitter A_1, may generate a range proof Pf_A_1 by itself to prove t_A_1≥0 and s_A_1≥t_A_1, while the other remitters A_2~A_m may generate range proofs Pf_A_2~Pf_A_m respectively and send the range proofs to this organizer respectively.

In some embodiments, the blockchain nodes may determine that the to-be-received amount t_B_j corresponding to the receiver B_j meets the following conditions: t_B_j≥0. Similar to the foregoing range proof Pf_A_i, the range proof technology may also be used to generate a range proof Pf_B_j corresponding to the to-be-received amount t_B_j. If a remitter A_x makes a transfer to a receiver B_y, the remitter A_x may generate a range proof Pf_B_y corresponding to a to-be-received amount t_B_y for this receiver B_y, and send this range proof Pf_B_y to the organizer; alternatively, the organizer may generate a range proof Pf_B_j corresponding to the to-be-received amount t_B_j.

At step 406, the organizer calculates a verification random number f.

In some embodiments, based on the remitter random numbers a_1~a_m corresponding to the remitters A_1~A_m, and the receiver random numbers b_1~b_n corresponding to the receivers B_1~B_n, a corresponding verification random number $f=a\_1+ \ldots +a\_m-b\_1- \ldots -b\_n$ may be calculated. Accordingly, based on the characteristics of the Pedersen commitment mechanism, this verification random number may be used in combination with the to-be-remitted amounts commitments T_A_1~T_A_m and the to-be-received amounts commitments T_B_1~T_B_n to verify $t\_a\_1+ \ldots +t\_a\_m = t\_b\_1- \ldots -t\_b\_n$. In other words, the total to-be-remitted amount is equal to the total to-be-received amount, that is, the input of the remittance transaction is equal to the output of the remittance transaction.

At step 407, the organizer obtains a signature of each remitter.

In some embodiments, the remitters A_1~A_m sign (A_1: T_A_1, Pf_A_1; ...; A_m: T_A_m, Pf_A_m; B_1:T_B_1, Pf_B_1; ...; B_n:T_B_n, Pf_B_n; f) respectively to obtain the corresponding remitter signatures SIG_A_1~SIG_A_m, and provide the remitter signatures to the organizer.

At step 408, the organizer submits a transaction to the blockchain.

In some embodiments, the organizer submits a corresponding remittance transaction (A_1:T_A_1, Pf_A_1; ...; A_m:T_A_m, Pf_A_m; B_1:T_B_1, Pf_B_1; ...; B_n:T_B_n, Pf_B_n; f; SIG_A_1, ..., SIG_A_m; SIG_B_1, ..., SIG_B_n) to the blockchain via the node 1 for execution of this remittance transaction. The remittance transaction may be transmitted to all the blockchain nodes in the blockchain network and all the blockchain nodes may verify this remittance transaction respectively to execute a remittance operation when the verification is successful, or to reject the remittance transaction when the verification is not successful.

At step 409, a blockchain node checks whether the transaction has been executed.

In some embodiments, the blockchain node may be any blockchain node in the blockchain network. In other words, every blockchain node in the blockchain network may receive the foregoing remittance transaction, and implement verification and other operations through Steps 409~412.

In other embodiments, after the blockchain node receives the foregoing remittance transaction, the blockchain node may use double-spending prevention mechanism or replay attack prevention mechanism to verify whether this remittance transaction has been executed. If this remittance transaction has been executed, the execution of this remittance transaction may be rejected, otherwise the process proceeds to Step 410.

At step 410, the blockchain node validates the signatures.

In some embodiments, the blockchain node may check whether the signatures SIG_A_i and SIG_B_j contained in the foregoing remittance transaction are correct or not. If the signatures are not correct, the execution of this remittance transaction may be rejected, otherwise the process proceeds to Step 411.

At step 411, the blockchain node validates the range proofs Pf_A_i and Pf_B_j.

In some embodiment, the blockchain node may, based on range proof technology, check the range proof Pf_A_i contained in the foregoing remittance transaction to determine whether the conditions of $t\_A\_i \geq 0$ and $s\_A\_i \geq t\_A\_i$ are met or not. Similarly, the blockchain node may, based on range proof technology, check range proof Pf_B_j contained in the foregoing remittance transaction to determine whether the condition of $t\_B\_j \geq 0$ is met or not. If any of the conditions is not met, the execution of this remittance transaction may be rejected, otherwise the process proceeds to Step 412.

At step 412, the blockchain node checks whether the total to-be-remitted amount is equal to the total to-be-received amount.

In some embodiments, for the verification random number f contained in the foregoing remittance transaction, the blockchain node may verify whether the equation $T\_A\_1+ \ldots +T\_A\_m-T\_B\_1- \ldots -T\_B\_n=PC(f,0)=f \times G+0 \times H=f \times G$ holds. If yes, it means that in the foregoing remittance transaction, the total to-be-remitted amount is equal to the total to-be-received amount, and the process proceeds to Step 413. If not, the execution of this remittance transaction may be rejected.

At step 413, in the maintained blockchain ledger, the blockchain nodes update the blockchain accounts corresponding to the remitters A_1~A_m and receivers B_1~B_n respectively.

In some embodiments, after the verification at Steps 409~412 succeeds, the blockchain nodes may update the blockchain accounts corresponding to the remitters A_1~A_m and receivers B_1~B_n respectively: the remitter's balances commitments T_A_1~T_A_m are added to the blockchain accounts corresponding to the remitters A_1~A_m, while the receiver's balances commitments T_B_1~T_B_n are added to the blockchain accounts corresponding to the receivers B_1~B_n.

For example, the added remitter's balance commitment T_A_1 corresponding to the blockchain account of the remitter A_1 (i.e., the blockchain account 1 of the user A), and the added receiver's balance commitment T_B_1 corresponding to the blockchain account of the receiver B_1 (i.e., the blockchain account 2 of the user B), respectively correspond to the actual remittance amount. Therefore, the remittance operation from the user A to the user B is ensured.

With respect to the other remitters A_2~A_m and receivers B_2~B_n, the corresponding to-be-remitted amounts t_A_2~t_A_m and to-be-received amounts t_B_2~t_B_n may all be zero, making the blockchain accounts corresponding to these cover-up remitters and cover-up receivers remain unchanged.

As the remitter's balances commitments T_A_1~T_A_m and the receiver's balances commitments T_B_1~T_B_n are recorded in the blockchain ledger, the actual values corresponding to-be-remitted amounts t_A_1~t_A_m and to-be-received amounts t_B_1~t_B_n cannot be obtained from a query of remittance transaction records in the blockchain ledger. Therefore, privacy of the remittance amount can be protected, and real identities of the remitters and receivers will not be exposed to public, thereby achieving anonymous remittance in blockchain and significantly improving the security and privacy of blockchain remittance.

Figure 5:
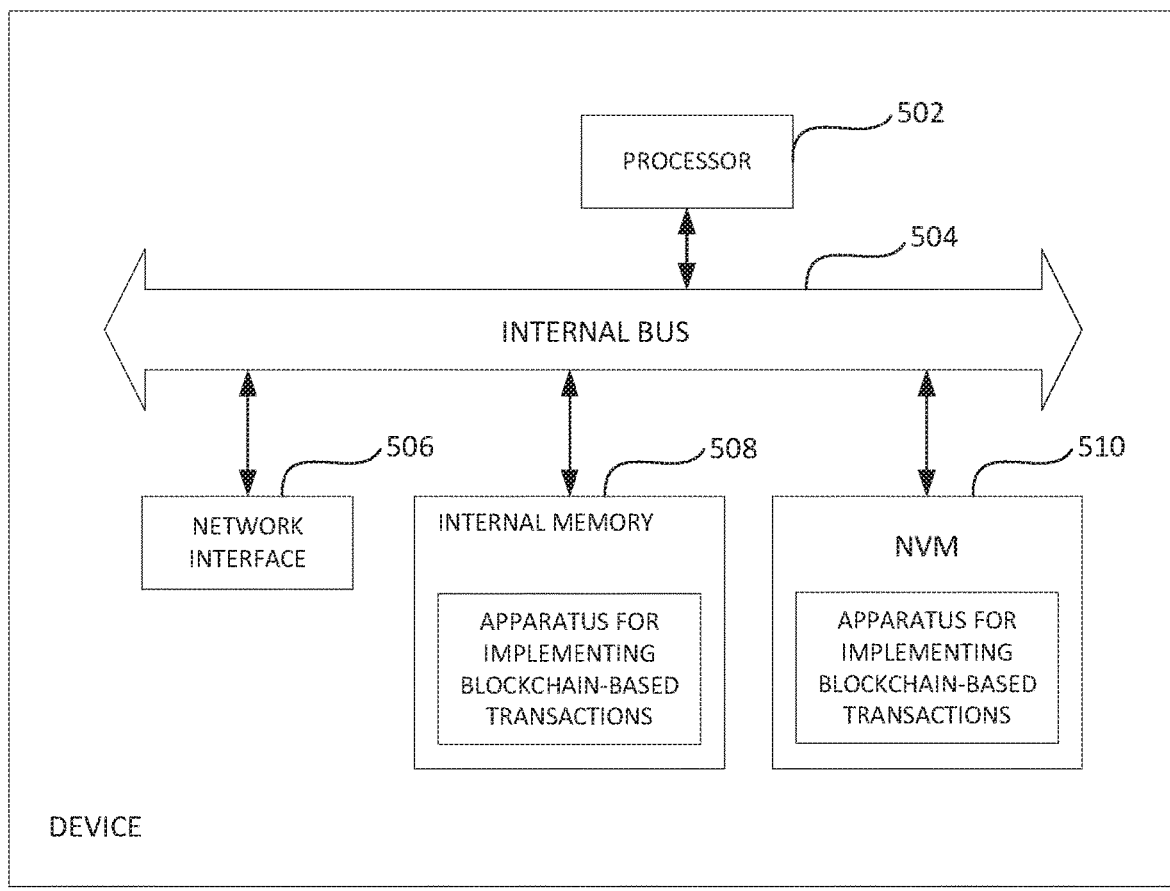
FIG. 5 is a structure diagram of a device according to some embodiments.

FIG. 5 is a structure diagram of a device according to various embodiments. At the level of hardware, the device comprises a processor 502, an internal bus 504, a network interface 506, an internal memory 508 and a nonvolatile memory (NVM) 510. The device may further comprise other hardware. In some embodiments, the processor 502 reads corresponding computer programs from the NVM 510 to the internal memory 508 and then executes the computer programs to form a blockchain transaction apparatus at a logical level. In addition to the software implementation manner, one or more embodiments of the present specification do not exclude other implementation manners, such as a logic device or a combination of software and hardware. That is, the executive bodies of the following processing flow are not limited to logic units and may be hardware or logic devices.

Figure 6:
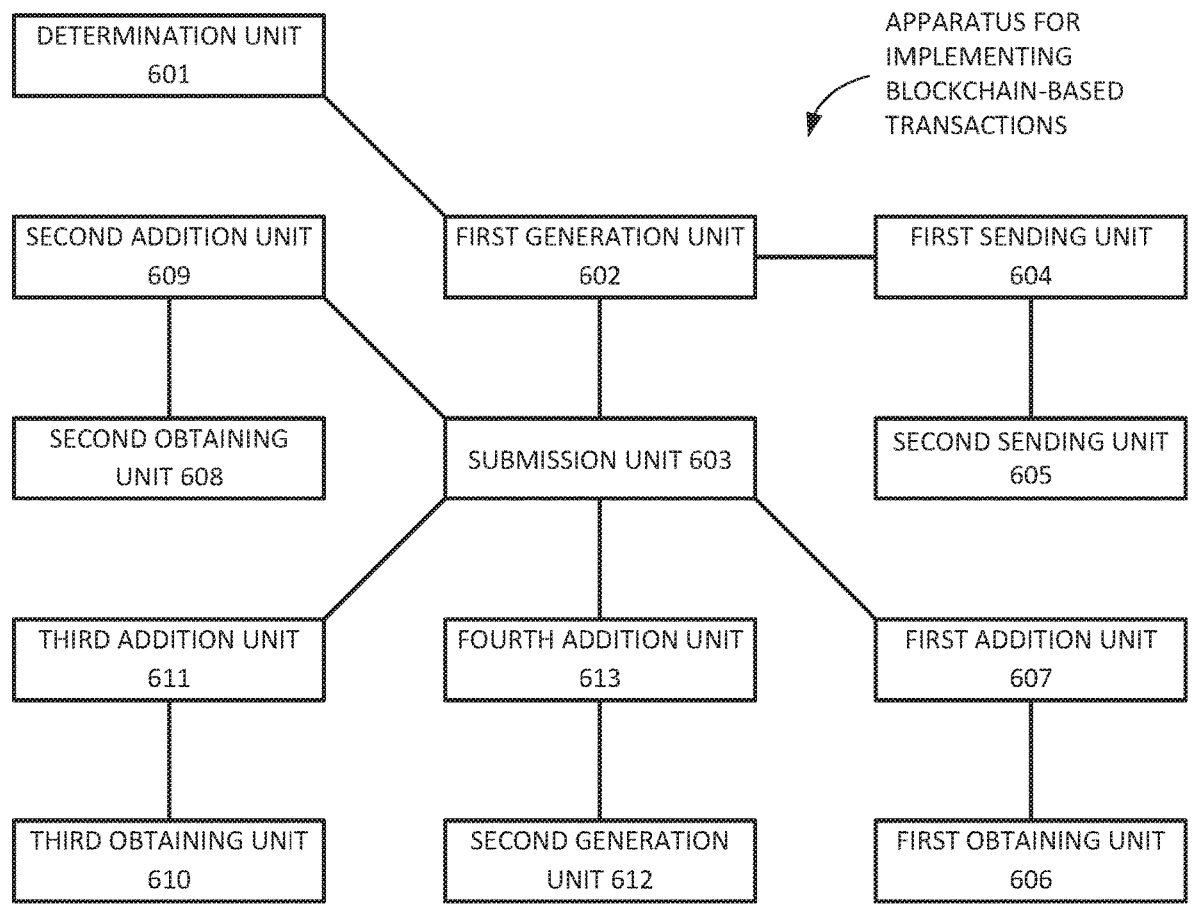
FIG. 6 is a block diagram of an apparatus for implementing blockchain-based transactions according to some embodiments.

Referring to FIG. 6, a block diagram of an apparatus for implementing blockchain-based transactions is provided according to various embodiments. In the software implementation manner, the apparatus for implementing blockchain-based transactions is applied to blockchain nodes and may comprise: a determination unit 601 configured to determine a to-be-remitted amount for each of remitters participating in a transaction and a to-be-received amount for each of receivers participating in the transaction, where the remitters include real remitters, the receivers include real receivers, the remitters include one or more cover-up remitters and/or the receivers include one or more cover-up receivers; a first generation unit 602 configured to generate a commitment of the to-be-remitted amount corresponding to the each remitter and generating a commitment of the to-be-received amount corresponding to the each receiver; and a submission unit 603 configured to submit the transaction to a blockchain, where the transaction comprises a blockchain account address of the each remitter, a blockchain account address of the each receiver, the each commitment of the to-be-remitted amount and the each commitment of the to-be-received amount, and where after the transaction is completed a corresponding commitment of the to-be-remitted amount is deducted from a commitment of the each remitter's balance recorded in the blockchain with the blockchain account address of the remitter and a corresponding commitment of the to-be-received amount is added to a commitment of the each receiver's balance recorded in the blockchain with the blockchain account address of the receiver.

In some embodiments, the transaction amounts between the real remitters and the real receivers are preset amounts. For example, after completion of the transaction, the preset amounts are deducted respectively from the real remitter's balances corresponding to the blockchain account addresses of the real remitters, the preset amounts are added respectively to the real receiver's balances corresponding to the blockchain account addresses of the real receivers, and the cover-up remitter's balances corresponding to the blockchain account addresses of the cover-up remitters and the cover-up receiver's balances corresponding to the blockchain account addresses of the cover-up receivers remain unchanged.

In other embodiments, the to-be-remitted amounts of the real remitters and the to-be-received amounts of the real receivers are both preset amounts, and the to-be-remitted amounts of the cover-up remitters and the to-be-received amounts of the cover-up receivers are both zero.

In still other embodiments, a receiver's balance commitment SBj corresponding to a receiver $B\_j$ is calculated by using a homomorphic encryption algorithm according to a receiver's balance $s\_B\_j$ and a receiver's balance random number $r\_B\_j$, and a to-be-received amount commitment $T\_B\_j$ corresponding to a receiver $B\_j$ is calculated by using the homomorphic encryption algorithm according to a to-be-received amount $t\_B\_j$ and a to-be-received amount random number $b\_j$. The apparatus further comprises:

a first sending unit 604 configured to send a to-be-received amount random number $b\_j$ to a receiver $B\_j$ via an off-chain channel for the receiver $B\_j$ to determine an updated receiver's balance $s\_B\_j'$ according to an updated receiver's balance commitment $S\_B\_j'$ and an updated receiver's balance random number $r\_B\_j'$;

For example, the updated receiver's balance commitment $S\_B\_j'$ is obtained by adding the to-be-received amount commitment $T\_B\_j$ to the receiver's balance commitment $S\_B\_j$, the updated receiver's balance random number $r\_B\_j'$ is obtained by adding the to-be-received amount random number $b\_j$ to the receiver's balance random number $r\_B\_j$, and the updated receiver's balance $s\_B\_j'$ is the sum of the receiver's balance $s\_B\_j$ and the to-be-received amount $t\_B\_j$.

In yet other embodiments, the apparatus further comprises:

a second sending unit 605 configured to send a to-be-received amount $t\_B\_j$ and a to-be-received amount commitment $T\_B\_j$ to a receiver $B\_j$ via an off-chain channel before submission of the transaction for the receiver $B\_j$ to verify the association among the to-be-received amount commitment $T\_B\_j$, the to-be-received amount random number $b\_j$ and the to-be-received amount $t\_B\_j$ corresponding to the receiver $B\_j$.

In other embodiments, the apparatus further comprises:

a first obtaining unit 606 configured to obtain a receiver signature $SIG\_B\_j$ that is generated by the receiver $B\_j$ via a receiver private key held by the receiver and is related to the to-be-received amount commitment $T\_B\_j$, where the receiver signature $SIG\_B\_j$ is generated by the receiver $B\_j$ after the association has passed verification, a first addition unit 607 configured to add the receiver signature $SIG\_B\_j$ to the transaction for the blockchain nodes in the blockchain to conduct signature verification.

In still other embodiments, the apparatus further comprises:

a second obtaining unit 608 configured to obtain a remitter signature $SIG\_A\_i$ that is generated by a remitter $A\_i$ via a remitter private key held by the remitter, a second addition unit 609 configured to add the remitter signature $SIG\_A\_i$ to the transaction for the blockchain nodes in the blockchain to conduct signature verification.

In yet other embodiments, the apparatus further comprises:

a third obtaining unit 610 configured to obtain a remitter range proof $Pf\_A\_i$ and a receiver range proof $Pf\_B\_j$, a third addition unit 611 configured to add the remitter range proof $Pf\_A\_i$ and the receiver range proof $Pf\_B\_j$ to the transaction for the blockchain nodes in the blockchain to conduct value verification, where the remitter range proof $Pf\_A\_i$ is used to prove that a to-be-remitted amount $t\_A\_i$ corresponding to a remitter $A\_i$ is not less than zero, and a remitter's balance $s\_A\_i$ corresponding to the remitter $A\_i$ is not less than the to-be-remitted amount $t\_A\_i$, and the receiver range proof $Pf\_B\_j$ is used to prove that a to-be-received amount $t\_B\_j$ corresponding to a receiver $B\_j$ is not less than zero.

In other embodiments, a to-be-remitted amount commitment $T\_A\_i$ is calculated by using a homomorphic encryption algorithm based on the to-be-remitted amount $t\_A\_i$ and a to-be-remitted amount random number $a\_i$ corresponding to the remitter $A\_i$, where $0<i\leq C$ m and m is the number of the remitters, and a to-be-received amount commitment $T\_B\_j$ is calculated by using a homomorphic encryption algorithm based on the to-be-received amount $t\_B\_j$ and the to-be-received amount random number $b\_j$ corresponding to the receiver $B\_j$, where $0<j\leq n$ and n is the number of the receivers. The apparatus further comprises:

a second generation unit 612 configured to generate a verification random number $f=a\_1+ \ldots +a\_m-b\_1- \ldots -b\_n$;

a fourth addition unit 613 configured to add the verification random number f in the transaction for the blockchain nodes in the blockchain to verify that the input of the transaction is equal to the output of the transaction.

The systems, apparatuses, modules or units illustrated in the foregoing embodiments may be achieved by computer chips or entities, or by products with certain functions. A typical device is computer. An example of the computer may be a personal computer, laptop computer, cell phone, camera phone, smart phone, PDA (personal digital assistant), media player, navigation device, email sending and receiving device, game console, tablet computer, wearable device or any combination of a few of these devices.

In a typical configuration, the computer comprises one or more processors (CPU), I/O interfaces, network interfaces and internal memories. The internal memory may be in a form of volatile memory, random access memory (RAM) and/or non-volatile memory such as read-only memory (ROM) or flash memory (flash RAM) in the computer readable media. Internal memory is an example of computer readable media.

Computer readable media include non-volatile and volatile, movable and non-movable media and may achieve information storage by any method or technology. Information may be computer readable instructions, data structures, program modules or other data. Examples of computer storage media include, but are not limited to, phase change random access memory (PRAM), static random access memory (SRAM), dynamic random access memory (DRAM) and other types of random access memory (RAM), read only memory (ROM), electrically erasable programmable read only memory (EEPROM), flash memory or other memory technologies, compact discread only memory (CD-ROM), digital versatile disc (DVD) or other optical memory, cassette type magnetic tape, magnetic disk memory, quantum memory, graphene-based storage media, or other magnetic storage devices or any other non-transfer media, which may be used to store information that is accessible to computer devices. According to the specification, computer readable media do not include transitory media, such as modulated data signals and carriers.

It should be further noted that terms "include," "contain" or any variants of these terms are intended to cover non-exclusive inclusion so that a process, method, commodity or equipment including a series of elements not only includes these elements but also includes other elements not clearly set out, or also include the elements inherent to such process, method, commodity or equipment. Unless otherwise with more limitations, the elements defined by a sentence "include one" do not exclude that the process, method, commodity or equipment including the elements also have other same elements.

Embodiments of the present specification are described above. Other embodiments are in the scope of the attached claims. In some embodiments, the actions or steps recorded in the claims may be executed in a sequence different from that given in the embodiments and can still achieve the expected results. Further, it is not necessary for the process described in the accompanying drawings to require the given specific sequence or a continuous sequence in order to achieve the expected results. In some embodiments, multi-tasking processing and parallel processing are also acceptable or may be favorable.

The terms used in one or a plurality of embodiments of the present specification are for the purpose of describing embodiments and not intended to limit one or more embodiments of the present specification. The singular forms "one," "the" and "this" used in one or more embodiments of the present specification and in the attached claims also are intended to cover plural forms unless their meanings are otherwise clearly indicated in the context. It should also be understood that the term "and/or" used in the text refers to any or all possible combinations containing one or more associated listed items.

It should be understood that although one or more embodiments of the present specification may use terms such as first, second and third to describe various kinds of information, the information should not be limited to these terms. These terms are intended to differentiate information of the same type. For example, without departing from the scope of one or more embodiments of the present specification, first information may also be referred to as second information, and similarly, second information may also be referred to as first information. Subject to the context, term "if" used here may be interpreted as "at the time of . . . ," "when . . . ," or "in response to determination."

The foregoing description is not intended to limit one or more embodiments of the present specification. Any modifications, equivalent replacements and improvements made without departing from the spirit and principle of one or more embodiments of the present specification shall fall within the scope of one or more embodiments of the present specification.

What is claimed is:

1. A system, comprising a first computing device and one or more nodes of a blockchain computer network, wherein a blockchain is on the blockchain computer network, and:
   the first computing device is configured to:
   hide identities of one or more real remitters and one or more real receivers participating in a transaction by adding one or more cover-up remitters and one or more cover-up receivers to the transaction such that the transaction includes a plurality of remitters comprising the real remitters and cover-up remitters, and a plurality of receivers comprising the real receivers and cover-up receivers, determining an amount to be remitted from a blockchain account of each of the remitters in the transaction, and determining an amount to be received at a blockchain account of each of the receivers in the transaction, wherein the amount remitted from each of the blockchain accounts of the one or more cover-up remitters is zero, and wherein the amount received at each of the blockchain accounts of the one or more cover-up receivers is zero;
   generate a commitment of each of the amounts to be remitted from the blockchain account of the remitter by applying a homomorphic encryption algorithm to the amount to be remitted according to a first random number corresponding to the remitter;
   generate a commitment of each of the amounts to be received at the blockchain account of the receiver by applying the homomorphic encryption algorithm to the amount to be received according to a second random number corresponding to the receiver, the plurality receivers corresponding to a plurality of second random numbers;
   send, via a non-blockchain computer network, to a plurality of second computing devices of the receivers, the amounts to be received at the blockchain accounts of the receivers, the commitments of the amounts to be received at the blockchain accounts of the receivers, and the plurality of second random numbers;
   receive, from the plurality of second computing devices, a plurality of receiver digital signatures, each of the receiver digital signatures corresponding to the receiver and indicating that that the receiver endorses the commitment of the amount to be received at the blockchain account of the receiver;

generate a blockchain transaction comprising a blockchain account address of each of the remitters, a blockchain account address of each of the receivers, the commitments of the amounts to be remitted, the commitments of the amounts to be received, and the receiver digital signatures; and submit the blockchain transaction to the one or more nodes of the blockchain computer network; and the one or more nodes are each configured to:

verify the blockchain transaction by at least verifying, based on a blockchain-based double-spending prevention mechanism or replay attack prevention mechanism, that the blockchain transaction has not been executed, and validating the receiver digital signatures;

add, to the blockchain, the verified blockchain transaction;

deduct each of the commitments of the amount to be remitted from the blockchain account of the remitter from a corresponding commitment of a balance of the remitter recorded in the blockchain in association with the blockchain account address of the remitter; and add each of the commitments of the amount to be received at the blockchain account of the receiver to a corresponding commitment of a balance of the receiver recorded in the blockchain in association with the blockchain account address of the receiver, wherein after deducting each of the commitments of the amount to be remitted and adding each of the commitments of the amount to be received, the balances of the cover-up remitters and the balances of the cover-up receivers remain unchanged.

2. The system of claim 1, wherein the commitments of the amounts to be remitted from the blockchain accounts of the remitters, the commitments of the amounts to be received at the blockchain accounts of the receivers, the commitments of the receiver balances, and the commitments of the remitter balances are Pedersen Commitments.

3. The system of claim 1, further comprising the one or more second computing devices, wherein the one or more second computing devices are configured to:

verify, for each of the receivers, an association among the commitment of the amount to be received at the receiver's blockchain account, the second random number, and the amount to be received at the receiver's blockchain account; and generate, for each of the receivers, using a private key of the receiver, the receiver digital signature.

4. The system of claim 1, wherein the first computing device is further configured to: obtain a remitter digital signature of each of the remitters, the remitter digital signatures endorsing the commitments of the amounts to be remitted from the blockchain accounts of the remitters, wherein the blockchain transaction comprises the remitter digital signatures.

5. The system of claim 1, wherein:

the first computing device is further configured to obtain one or more remitter range proofs and one or more receiver range proofs, wherein the generated blockchain transaction comprises the one or more remitter range proofs and the one or more receiver range proofs; and the one or more nodes are each further configured to:

verify, based on the one or more remitter range proofs, that the amount to be remitted from the blockchain account of each of the remitters is not less than zero and not greater than the balance of the blockchain account of the remitter; and verify, based on the one or more receiver range proofs, that the amount to be received at the blockchain account of each of the receivers is not less than zero.

6. The system of claim 1, wherein:

the first computing device is further configured to: generate a verification random number by computing a difference between the sum of the first random numbers and the sum of the second random numbers, wherein the generated blockchain transaction comprises the verification random number; and the one or more nodes are each further configured to verify, based on the verification random number, that a total of the amounts to be received is equal to a total of the amounts to be remitted.

7. The system of claim 1, wherein the amount to be remitted from the blockchain account of each of the real remitters and the amount to be received at the blockchain account of each of the real receivers are preset.

8. One or more non-transitory computer-readable mediums storing instructions executable by one or more processors, wherein execution of the instructions cause the one or more processors to perform operations comprising:

hiding identities of one or more real remitters and one or more real receivers participating in a transaction by adding one or more cover-up remitters and one or more cover-up receivers to the transaction such that the transaction includes a plurality of remitters comprising the real remitters and cover-up remitters, and a plurality of receivers comprising the real receivers and cover-up receivers, determining an amount to be remitted from a blockchain account of each of the remitters in the transaction, and determining an amount to be received at a blockchain account of each of the receivers in the transaction, wherein the amount remitted from each of the blockchain accounts of the one or more cover-up remitters is zero, and wherein the amount received at each of the blockchain accounts of the one or more cover-up receivers is zero;

generating a commitment of each of the amounts to be remitted from the blockchain account of the remitter by applying a homomorphic encryption algorithm to the amount to be remitted according to a first random number corresponding to the remitter;

generating a commitment of each of the amounts to be received at the blockchain account of the receiver by applying the homomorphic encryption algorithm to the amount to be received according to a second random number corresponding to the receiver, the plurality receivers corresponding to a plurality of second random numbers;

sending, via a non-blockchain computer network, to a plurality of computing devices of the receivers, the amounts to be received at the blockchain accounts of the receivers, the commitments of the amounts to be received at the blockchain accounts of the receivers, and the plurality of second random numbers;

receiving, from the plurality of computing devices, a plurality of receiver digital signatures, each of the receiver digital signatures corresponding to the receiver and indicating that that the receiver endorses the commitment of the amount to be received at the blockchain account of the receiver;

generating a blockchain transaction comprising a blockchain account address of each of the remitters, a blockchain account address of each of the receivers, the commitments of the amounts to be remitted, the commitments of the amounts to be received, and the receiver digital signatures;

submitting the blockchain transaction to one or more nodes of a blockchain computer network;

verifying the blockchain transaction by at least verifying, based on a blockchain-based double-spending prevention mechanism or replay attack prevention mechanism, that the blockchain transaction has not been executed, and validating the receiver digital signatures;

adding, to a blockchain, the verified blockchain transaction;

deducting each of the commitments of the amount to be remitted from the blockchain account of the remitter from a corresponding commitment of a balance of the remitter recorded in the blockchain in association with the blockchain account address of the remitter; and adding each of the commitments of the amount to be received at the blockchain account of the receiver to a corresponding commitment of a balance of the receiver recorded in the blockchain in association with the blockchain account address of the receiver, wherein after deducting each of the commitments of the amount to be remitted and adding each of the commitments of the amount to be received, the balances of the cover-up remitters and the balances of the cover-up receivers remain unchanged.

9. The one or more non-transitory computer-readable mediums of claim 8, wherein the commitments of the amounts to be remitted from the blockchain accounts of the remitters, the commitments of the amounts to be received at the blockchain accounts of the receivers, the commitments of the receiver balances, and the commitments of the remitter balances are Pedersen Commitments.

10. The one or more non-transitory computer-readable mediums of claim 8, wherein the operations further comprise:

verifying, for each of the receivers, an association among the commitment of the amount to be received at the receiver's blockchain account, the second random number, and the amount to be received at the receiver's blockchain account; and generating, for each of the receivers, using a private key of the receiver, the receiver digital signature.

11. The one or more non-transitory computer-readable mediums of claim 8, wherein the operations further comprise: obtaining a remitter digital signature of each of the remitters, the remitter digital signatures endorsing the commitments of the amounts to be remitted from the blockchain accounts of the remitters, wherein the blockchain transaction comprises the remitter digital signatures.

12. The one or more non-transitory computer-readable mediums of claim 8, wherein the operations further comprise:

obtaining one or more remitter range proofs and one or more receiver range proofs, wherein the generated blockchain transaction comprises the one or more remitter range proofs and the one or more receiver range proofs;

verifying, based on the one or more remitter range proofs, that the amount to be remitted from the blockchain account of each of the remitters is not less than zero and not greater than the balance of the blockchain account of the remitter; and verifying, based on the one or more receiver range proofs, that the amount to be received at the blockchain account of each of the receivers is not less than zero.

13. The one or more non-transitory computer-readable mediums of claim 8, wherein the operations further comprise:

generating a verification random number by computing a difference between the sum of the first random numbers and the sum of the second random numbers, wherein the generated blockchain transaction comprises the verification random number; and verifying, based on the verification random number, that a total of the amounts to be received is equal to a total of the amounts to be remitted.

14. The one or more non-transitory computer-readable mediums of claim 8, wherein the amount to be remitted from the blockchain account of each of the real remitters and the amount to be received at the blockchain account of each of the real receivers are preset.

15. A method, comprising:

hiding, at a first computing device, identities of one or more real remitters and one or more real receivers participating in a transaction by adding one or more cover-up remitters and one or more cover-up receivers to the transaction such that the transaction includes a plurality of remitters comprising the real remitters and cover-up remitters, and a plurality of receivers comprising the real receivers and cover-up receivers, determining an amount to be remitted from a blockchain account of each of the remitters in the transaction, and determining an amount to be received at a blockchain account of each of the receivers in the transaction, wherein the amount remitted from each of the blockchain accounts of the one or more cover-up remitters is zero, and the amount received at each of the blockchain accounts of the one or more cover-up receivers is zero;

generating, at the first computing device, a commitment of each of the amounts to be remitted from the blockchain account of the remitter by applying a homomorphic encryption algorithm to the amount to be remitted according to a first random number corresponding to the remitter;

generating, at the first computing device, a commitment of each of the amounts to be received at the blockchain account of the receiver by applying the homomorphic encryption algorithm to the amount to be received according to a second random number corresponding to the receiver, the plurality receivers corresponding to a plurality of second random numbers;

sending, at the first computing device, via a non-blockchain computer network, to a plurality of second computing devices of the receivers, the amounts to be received at the blockchain accounts of the receivers, the commitments of the amounts to be received at the blockchain accounts of the receivers, and the plurality of second random numbers;

receiving, at the first computing device, from the plurality of second computing devices, a plurality of receiver digital signatures, each of the receiver digital signatures corresponding to the receiver and indicating that that the receiver endorses the commitment of the amount to be received at the blockchain account of the receiver;

generating, at the first computing device, a blockchain transaction comprising a blockchain account address of each of the remitters, a blockchain account address of each of the receivers, the commitments of the amounts to be remitted, the commitments of the amounts to be received, and the receiver digital signatures;

submitting, at the first computing device, the blockchain transaction to one or more nodes of a blockchain computer network;

verifying, at the one or more nodes, the blockchain transaction by at least verifying, based on a blockchain-based double-spending prevention mechanism or replay attack prevention mechanism, that the blockchain transaction has not been executed, and validating the receiver digital signatures;

adding, at the one or more nodes, to a blockchain, the verified blockchain transaction;

deducting, at the one or more nodes, each of the commitments of the amount to be remitted from the blockchain account of the remitter from a corresponding commitment of a balance of the remitter recorded in the blockchain in association with the blockchain account address of the remitter; and adding, at the one or more nodes, each of the commitments of the amount to be received at the blockchain account of the receiver to a corresponding commitment of a balance of the receiver recorded in the blockchain in association with the blockchain account address of the receiver, wherein after deducting each of the commitments of the amount to be remitted and adding each of the commitments of the amount to be received, the balances of the cover-up remitters and the balances of the cover-up receivers remain unchanged.

16. The method of claim 15, wherein the commitments of the amounts to be remitted from the blockchain accounts of the remitters, the commitments of the amounts to be received at the blockchain accounts of the receivers, the commitments of the receiver balances, and the commitments of the remitter balances are Pedersen Commitments.

17. The method of claim 15, further comprising:

verifying, at the plurality of second computing devices, for each of the receivers, an association among the commitment of the amount to be received at the receiver's blockchain account, the second random number, and the amount to be received at the receiver's blockchain account; and generating, at the plurality of second computing devices, for each of the receivers, using a private key of the receiver, the receiver digital signature.

* * * * *